(12) United States Patent
Hess (10) Patent No.: US 8,598,899 B2
(45) Date of Patent: Dec. 3, 2013

(54) BUILT-IN TEST FOR AN OVERVOLTAGE PROTECTION CIRCUIT

(75) Inventor: Gary L. Hess, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 498 days.

(21) Appl. No.: 13/013,292

(22) Filed: Jan. 25, 2011

(65) Prior Publication Data

US 2012/0187969 A1 Jul. 26, 2012

(51) Int. Cl.
*G01R 31/02* (2006.01)

(52) U.S. Cl.
USPC ............ 324/750.3; 324/750.01; 324/762.01; 324/762.03; 324/537; 307/130; 307/112; 361/91.1; 361/91.5; 361/118

(58) Field of Classification Search
CPC ...... G01R 31/02; G01R 31/3187; H02H 1/04; H02H 9/04; H02H 9/00
USPC ............... 361/91.1, 91.5, 118; 714/733, 734; 307/112, 130
See application file for complete search history.

(56) References Cited

U.S. PATENT DOCUMENTS

| 4,271,446 | A | 6/1981 | Comstock |
| 6,538,345 | B1 * | 3/2003 | Maller ........................... 307/86 |
| 6,816,350 | B1 * | 11/2004 | Hoopes ........................... 361/90 |
| 8,203,815 | B2 * | 6/2012 | Kilroy et al. .................. 361/91.1 |

* cited by examiner

*Primary Examiner* — Huy Q Phan
*Assistant Examiner* — Robert Alejnikov, Jr.
(74) *Attorney, Agent, or Firm* — Kinney & Lange, P.A.

(57) ABSTRACT

An overvoltage protection circuit connected to protect electrical components from overvoltage conditions includes a blocking diode connected in series with a transient voltage suppression device (TVS) via a first node and includes a reference voltage for biasing the first node at a voltage sufficient to reverse bias the blocking diode during normal operations. A built-in test circuit associated with the overvoltage protection circuit includes a resistor connected to the first node and a switch connected in series with the resistor that is selectively turned On and Off. The built-in test circuit monitors voltage on a control line associated with the electrical components and at the first node while the switch is Off and while the switch is On, and detects fault conditions based on the monitored voltages.

19 Claims, 7 Drawing Sheets

BUILT-IN TEST FOR AN OVERVOLTAGE PROTECTION CIRCUIT

BACKGROUND

The present invention is related to a system and method of testing voltage suppressor systems.

Transient voltage suppression (TVS) devices are commonly used in electronic circuitry to protect sensitive components from the effects of transient overvoltage conditions. A commonly employed configuration includes a TVS diode connected in shunt with the protected circuitry. In response to a transient overvoltage event exceeding the avalanche breakdown potential of the TVS diode, excess current is shunted through the TVS diode, suppressing all overvoltages above the breakdown voltage of the TVS diode. In this way, the TVS diode acts to clamp the voltage below the avalanche breakdown potential of the TVS diode, thereby protecting sensitive components from damage.

TVS devices are commonly used in aircraft applications to protect electronic circuitry from transient overvoltage conditions caused by lightning strikes. However, once installed it is difficult to test whether the TVS device is working properly. In particular, in aircraft applications testing of TVS devices requires the aircraft to be at a servicing center having equipment capable of generating a controlled pulse of energy sufficient to activate the TVS diode and test the external response of the system to determine whether the circuit is working properly.

SUMMARY

The present invention is a built-in test circuit for an overvoltage protection circuit that is connected to provide overvoltage protection to electrical components having a control line output. The overvoltage protection circuit includes a blocking diode connected in series with a transient voltage suppression (TVS) device via a first node and further includes a reference voltage for biasing the first node at a voltage sufficient to reverse bias the blocking diode during normal operations. The built-in test circuit includes a resistor connected to the first node and a switch connected in series with the resistor that is selectively turned On and Off to test the overvoltage protection circuit. The built-in test circuit monitors voltage on the control line output and at the first node while the switch is both On and Off. Based on the monitored voltages, the built-in test circuit detects the presence of fault conditions in the overvoltage protection circuit.

DETAILED DESCRIPTION

Figure 1:
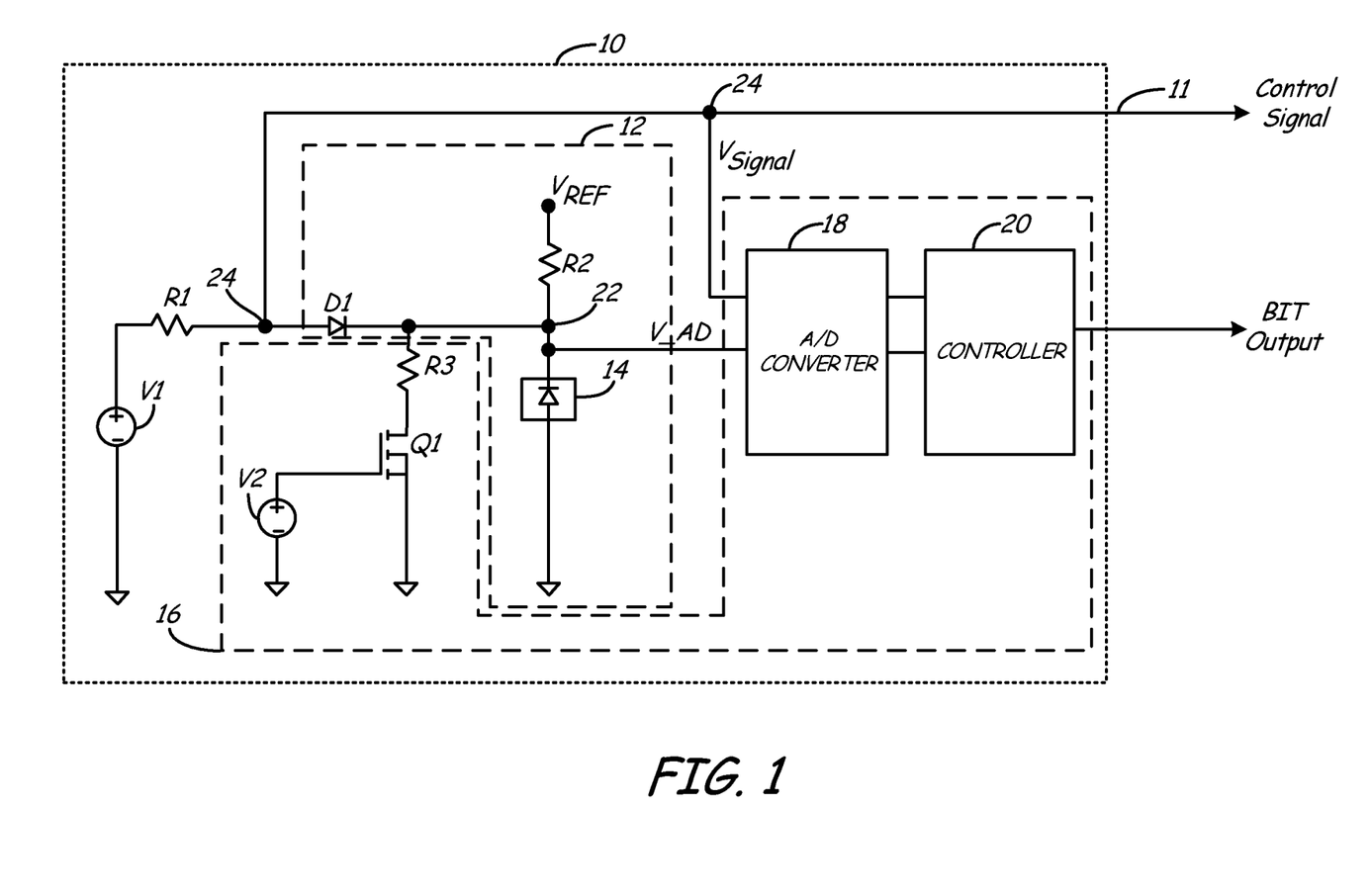
FIG. 1 is a circuit diagram of a system that includes transient voltage suppression (TVS) with built-in testing according to an embodiment of the present invention.

FIG. 1 is a circuit diagram of electrical system 10 having automated transient voltage suppression (TVS) protection with test capability. In one embodiment, electrical system 10 may be implemented in on-board aircraft electronics. Voltage source V1 and resistor R1 generate an analog input/output (I/O) control signal (labeled 'Control Signal') for communication to a device external to electrical system 10 via control line 11. In other embodiments, various electrical components may be employed to develop the desired control signal, and the control signal may be an input signal, output signal, input/output signal, or drive signal. Typically, the control signal is connected to external devices that may be subject to transient overvoltage conditions, such as lightning strikes, which if unmitigated could be communicated to electrical components such as voltage source V1 and resistor R1 with the potential of damaging these components.

Overvoltage protection circuit 12 is connected to control line 11 and in parallel with resistor R1 and voltage source V1, and includes diode D1, resistor R2, reference voltage $V_{REF}$ and TVS device 14. Overvoltage protection circuit 12 is activated to protect electrical components such as resistor R1 and voltage source V1 by shunting excess transient voltages detected on control line 11.

Built-in test circuit 16, connected to test the operation of overvoltage protection circuit 12, includes voltage source V2, resistor R3, switch Q1, analog-to-digital converter 18, and controller 20. In the embodiment shown in FIG. 1, switch Q1 is a transistor (e.g., metal-oxide semiconductor field-effect transistor MOSFET), but in other embodiments may be implemented with other well-known switch technologies. A/D converter 18 monitors the voltage on control line 11 (labeled 'V_signal') via voltage node 24 and the voltage at the cathode of TVS device 14 via voltage node 22 (labeled 'V_AD') and converts the monitored analog signals to respective digital signals. Controller 20 detects the presence of faults within TVS circuit 12 based on the digital signals received from A/D converter 18. Components such as A/D converter 18 and controller 20 may receive inputs from a plurality of additional devices and components, and provide other functionality in addition to built-in test of overvoltage protection circuit 12. That is, A/D converter 18 and controller 20 may not be exclusive to built-in test circuit 16.

During normal operation (i.e., when no overvoltage condition exists on control line 11), TVS device 14 remains inactive. Reference voltage $V_{REF}$, resistor R2 and diode D1 are employed to minimize leakage and capacitance associated with TVS device 14. In particular, diode D1 is connected in series with TVS device 14 to reduce the capacitance of overvoltage protection circuit 12. To minimize leakage currents from affecting the control signal, reference voltage $V_{REF}$ and resistor R2 act to maintain a voltage at node 22 that is greater than the expected (i.e., normal) voltage on control line 11, thereby reverse biasing diode D1 and preventing the flow of leakage current from control line 11 into overvoltage protection circuit 12.

Transient voltages on control line 11 causes diode D1 to become forward biased, thereby increasing the voltage at voltage node 22. At a threshold defined by the selection of TVS device 14, the device is activated and acts to shunt excess voltage from control line 11. For example, in embodiments employing a Zener diode as the TVS device, the breakdown voltage associated with the Zener diode determines the threshold voltage at which TVS device 14 is activated. Proper operation of overvoltage circuit 12 requires diode D1, reference voltage $V_{REF}$, and TVS device 14 to be connected properly and in good working order.

Built-in test circuit 16 provides built-in testing of overvoltage protection circuit 12 to detect events such as component failure or connection failures. Testing may be performed at various times, including at startup of the system, periodically during operation, or at upon request. The test process includes selectively activating switch Q1 and monitoring the voltage at the cathode of TVS device 14 (i.e, the voltage V_AD measured at voltage node 22) and the voltage on control line 11 (i.e., voltage V_signal). A/D converter 18 converts the analog signals to digital signals and provides them to controller 20 to determine whether an error condition exists.

To test overvoltage protection circuit 12, voltage signals V_AD and V_signal are monitored while Q1 is Off and again while Q1 is On. For each condition, if overvoltage protection circuit 12 is operating properly then expected voltages should be monitored by test circuit 16. For example, when switch Q1 is Off, diode D1 should be reverse biased and TSV device 14 is inactive such that the monitored voltage V_AD is equal to the reverse standoff voltage defined by the reference voltage $V_{REF}$ and resistor R2 and the monitored voltage V_control is equal to the voltage defined by voltage source V1 and resistor R1 on control line 11. If the monitored voltages V_AD and V_signal are not equal to the expected values, it is an indication of an error in overvoltage protection circuit 12.

When switch Q1 is turned On, the voltage at node 22 is pulled down through resistor R3. Assuming diode D1 is connected and operating properly, pulling down the voltage at node 22 causes diode D1 to become forward biased. In response, the voltage V_signal is pulled down through diode D1, resistor R3 and switch Q1. As a result, the monitored voltage V_AD is greater than the monitored voltage V_signal by an amount equal to the voltage drop across diode D1. In the event the monitored voltage V_AD and V_signal are not equal to the expected values, in particular, wherein the difference between the monitored voltages is not equal to the voltage drop across diode D1, this is indicative of a fault condition in diode D1 or the connection of diode D1.

Based on the monitored voltage signals, controller 20 determines whether a fault condition is present, and provides an output indicating the presence of a detected fault. In one embodiment, controller 20 initiates a test of overvoltage protection circuit 12 by selectively turning On and Off switch Q1 via voltage source V2. The output generated by controller 20 may be provided to a higher level system or as an output to an operator indicating the presence of a detected fault.

Figure 2:
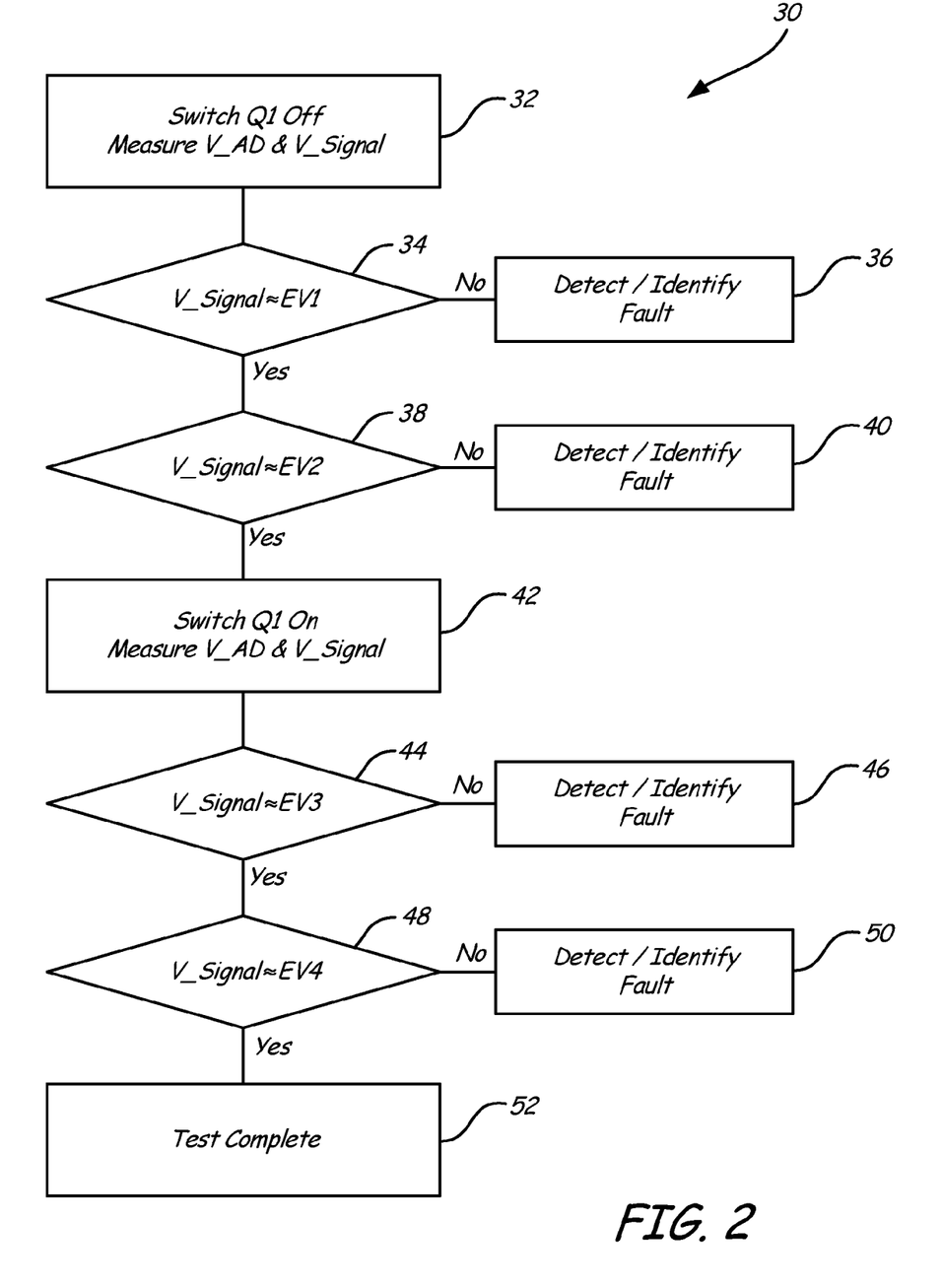
FIG. 2 is a flowchart illustrating built-in test of the TVS circuit according to an embodiment of the present invention.

FIG. 2 is a flowchart illustrating a method of testing the TVS circuit according to an embodiment of the present invention. Testing process 30 is a two-stage process, with some faults detected during a first stage in which switch Q1 is Off and other faults detected during a second stage in which switch Q1 is On. At step 32, switch Q1 is maintained in an Off state while the voltage on the control line and the voltage at the cathode of TVS device 14 (i.e., the voltage at the node between blocking diode D1 and TVS device 14) is measured. In the embodiment shown in FIG. 1, this step is performed by A/D converter 18, which monitors the voltage V_signal and V_AD.

At steps 34 and 38 the monitored voltages are analyzed to determine whether a fault condition exist within the TVS circuit. At each of these steps, the monitored voltages are compared with voltage values expected during normal operation, but it should be understood that in other embodiments the monitored voltages could be compared with voltage values expected during particular fault conditions. In the embodiment shown in FIG. 1, controller 20 is responsible for analyzing the monitored signals. Controller 20 may be a microprocessor, logic circuit, analog circuit, microcontroller, or equivalent device for analyzing the monitored signals. In addition, the examples provided with respect to FIG. 2 are based, in part, on the magnitude of the voltage sources V1, V2 and V3, and the resistive values selected with respect to resistors R1, R2, and R3. In one embodiment, the resistive ratio between resistors R2:R1 is approximately 100:1, while the resistive ratio between resistors R2:R3 is 200:1. It should be understood that in other embodiments, other resistive ratios may be selected, and resistors R1, R2, and R3 represent equivalent resistances, but may actually by comprised of a plurality of resistive devices.

At step 34, the voltage signal V_signal is analyzed with respect to an expected voltage value EV1. For example, in one embodiment the normal voltage value provided by voltage source V1 and resistor R1 is a 10 V signal. If the monitored voltage signal V_signal is not approximately equal to this voltage value (i.e., voltage value EV1), then at step 36 a failure is identified. In addition, step 36 may include identifying the type of fault detected. For example, a short-circuit condition in TVS device 14 (as shown in FIG. 1) results in the voltage signal V_signal being approximately equal to 0V (i.e., ground) plus the voltage drop across diode D1.

At step 38, the monitored voltage value V_AD is also analyzed with respect to an expected voltage value EV2. For example, in one embodiment if the expected voltage V_signal on the control line is 10 V, then reference voltage $V_{REF}$ and resistor R2 will be designed to bias voltage node 22 to a higher voltage (e.g., 12 V). If the monitored voltage V_AD is not approximately equal to expected voltage value EV2, then at step 40 a fault is indicated. In other embodiments the type of fault may also be detected. For example, a short on diode D1 results in the monitored voltage V_AD being equal to the monitored voltage V_signal on control line 11 (e.g., in our example, approximately 10 V). In addition, a short in TVS device 14 results in the monitored voltage V_AD being approximately equal to ground, whereas an open condition in TVS device 14 results in the monitored voltage V_AD being approximately equal to the reference voltage (e.g., 15 V in our example).

At step 42, switch Q1 is turned On and voltages are once again measured on control line 11 (V_signal) and at the cathode of TVS device 14. At steps 44 and 48 the monitored signals are analyzed to detect the presence of fault conditions in TVS circuit 12.

At step 44, the voltage signal V_signal is analyzed with respect to an expected voltage value EV3. For example, in the embodiment described above when switch Q1 is On, the voltage on the control signal is pulled down through diode D1 and resistor R3 to an expected value of approximately 7 V. If the monitored voltage signal V_signal is not approximately equal to a value of 7 V (i.e., voltage value EV3), then at step 46 a failure is identified. In addition, step 46 may include identifying the type of fault detected. For example, an open-circuit fault on diode D1 results in the voltage signal V_signal remaining unchanged when switch Q1 is turned On (i.e., remains equal to approximately 10 V).

At step 48, the voltage signal V_AD is analyzed with respect to an expected voltage value EV4. For example, when switch Q1 is On and blocking diode D1 is conducting, then the voltage V_AD should be equal to the pull-down voltage monitored on control line 11 plus the voltage drop across blocking diode D1 (e.g., 7 V+0.7 V=7.7 V). If the monitored voltage signal V_AD is not approximately equal to a value of 7.7 V (i.e., voltage value EV4), then at step 50 a failure is identified. In addition, step 50 may include identifying the type of fault detected.

Figure 3A:
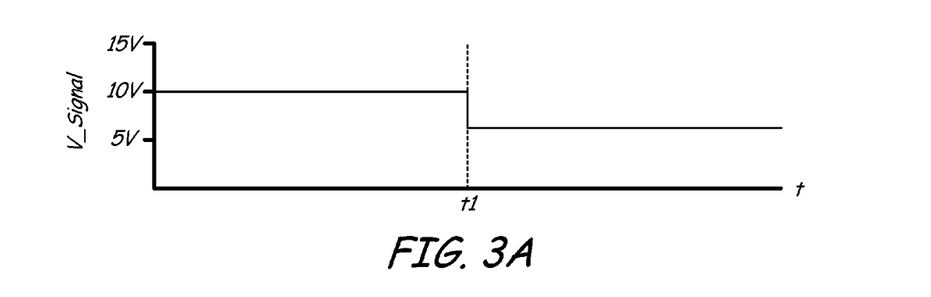
FIGS. 3A-3C are waveform diagrams illustrating built-in test (BIT) of the TVS circuit with no fault condition present according to an embodiment of the present invention.
Figure 3B:
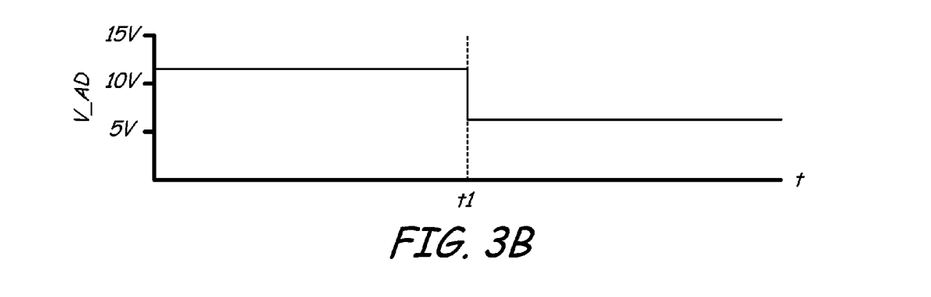
Figure 3C:
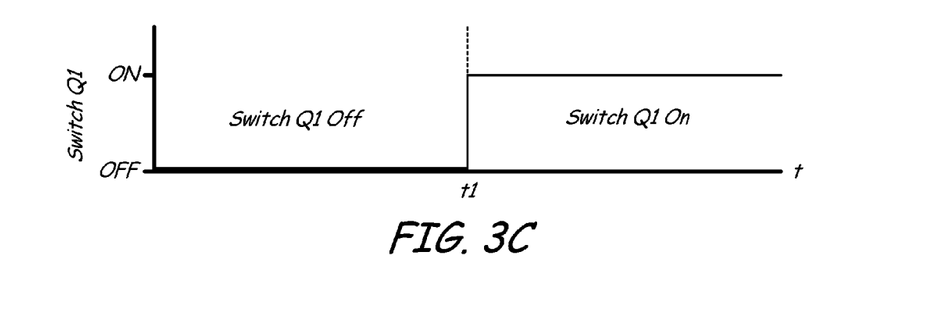

FIGS. 3A-3C are waveform diagrams illustrating simulated voltages monitored during built-in test of a properly operating overvoltage protection circuit 12. FIG. 2A is a waveform of monitored voltage signal V_signal, FIG. 2B is a waveform of monitored voltage signal V_AD, and FIG. 2C is a waveform indicating the state of switch Q1. For purposes of this simulation, reference voltage $V_{REF}$ provides a 15 Volt (V) source, the control signal provided on control line 11 has an expected voltage of approximately 10 V.

Initially, switch Q1 is Off. The monitored voltage V_signal is equal to approximately 10 V as determined by the excitation provided by voltage source V1 and resistor R1. The monitored voltage V_AD provided at node 22 is equal to approximately 12 V based on the voltage provided by reference voltage $V_{REF}$ and resistor R2, indicating that TVS device 14 is operating properly.

At time t1, switch Q1 is turned On. The monitored voltage V_AD is pulled down through resistor R3 as a result of switch Q1 being On to a value of approximately 7 V. Diode D1 is forward biased, causing the monitored voltage V_signal to be pulled down through diode D1 and resistor R3 to a value of approximately 7.7 V (i.e., equal to the monitored voltage V_AD plus the voltage drop across diode D1). This simulation represents the voltage monitored with respect to a properly operating lightning protection circuit.

FIGS. 4A-7C are waveform diagrams illustrating simulated voltage monitored during built-in test of overvoltage protection circuit 12 having various fault conditions according to an embodiment of the present invention. The simulation is based on the same simulation described with respect to FIGS. 3A-3C, which simulated the voltages expected if no fault conditions were present.

Figure 4A:
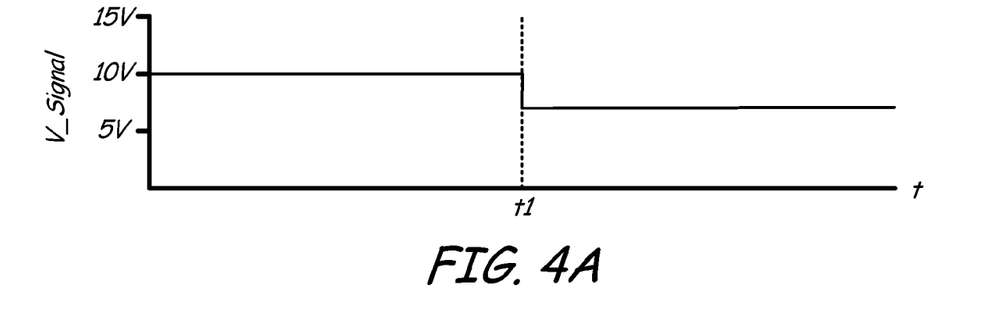
FIGS. 4A-4C are waveform diagrams illustrating built-in test (BIT) of the TVS circuit with a short-circuit fault across a blocking diode included within the TVS circuit according to an embodiment of the present invention.
Figure 4B:
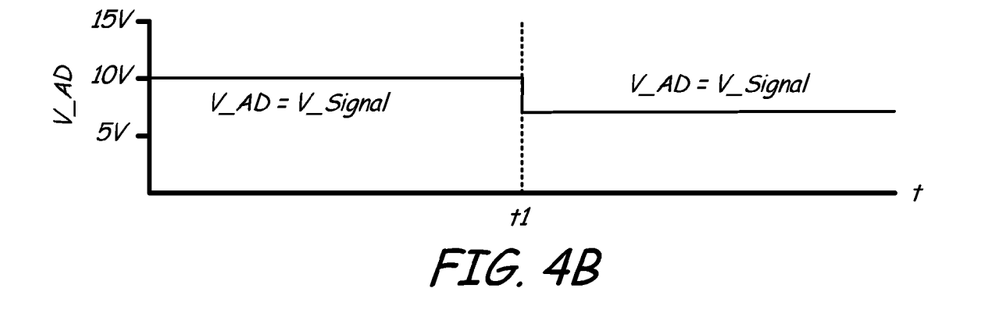
Figure 4C:
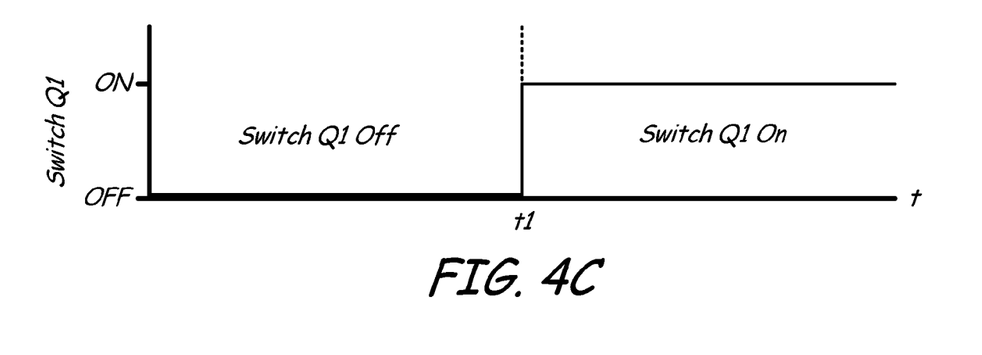
Figure 5A:
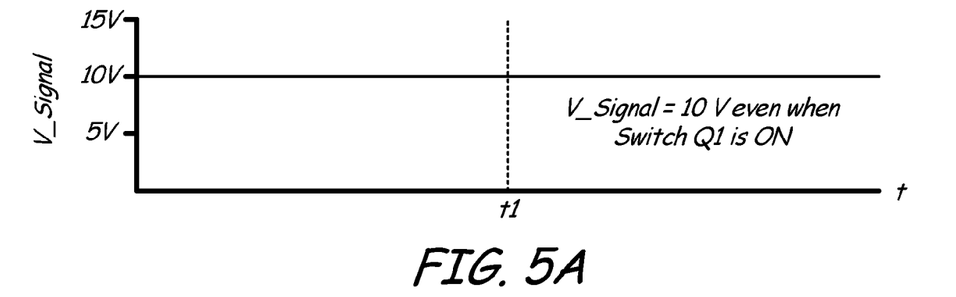
FIGS. 5A-5C are waveform diagrams illustrating built-in test (BIT) of the TVS circuit with an open-circuit fault across a blocking diode included within the TVS circuit according to an embodiment of the present invention.
Figure 5B:
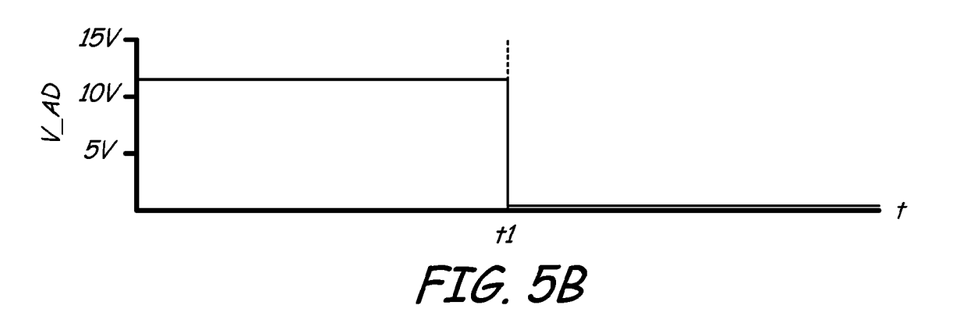
Figure 5C:
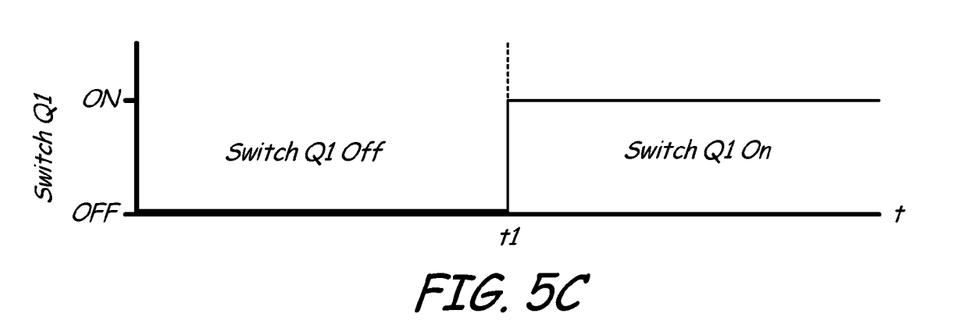
Figure 6A:
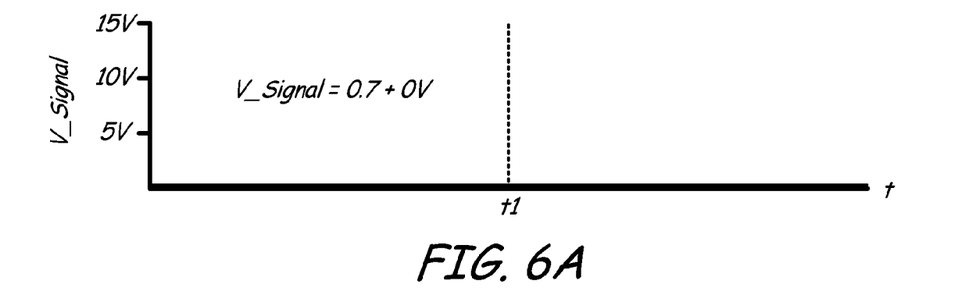
FIGS. 6A-6C are waveform diagrams illustrating built-in test (BIT) of the TVS circuit with a short-circuit fault across a TVS device included within the TVS circuit according to an embodiment of the present invention.
Figure 6B:
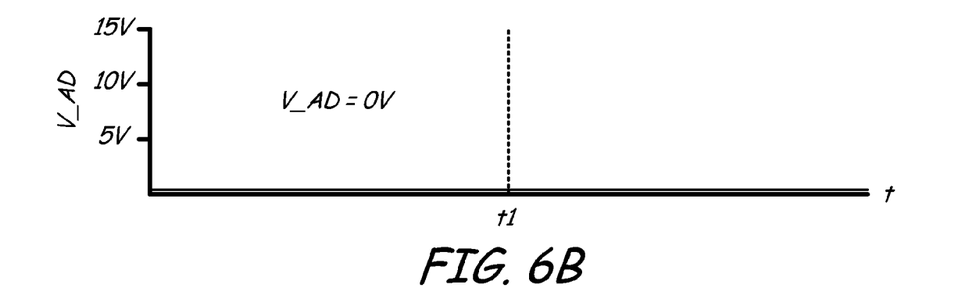
Figure 6C:
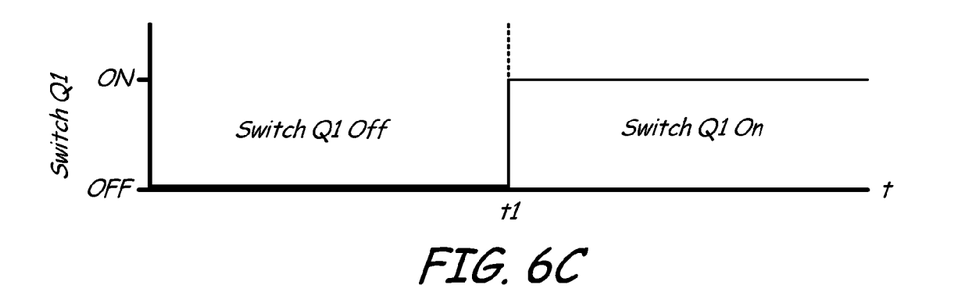
Figure 7A:
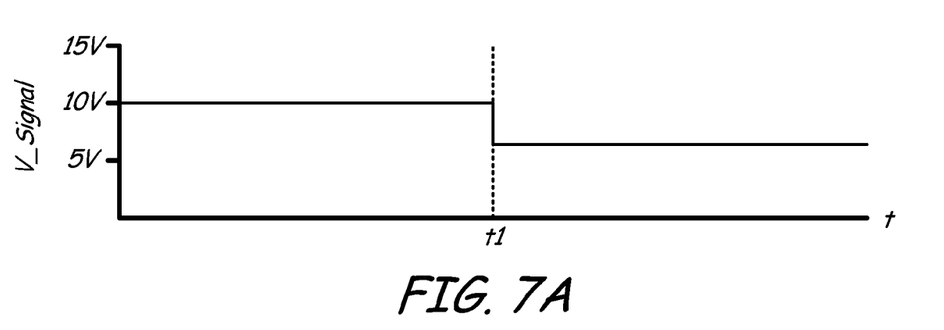
FIGS. 7A-7C are waveform diagrams illustrating built-in test (BIT) of the TVS circuit with an open-circuit fault across a TVS device included within the TVS circuit according to an embodiment of the present invention.
Figure 7B:
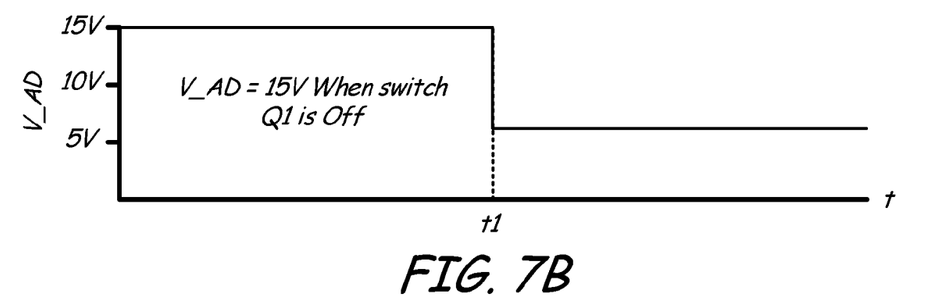
Figure 7C:
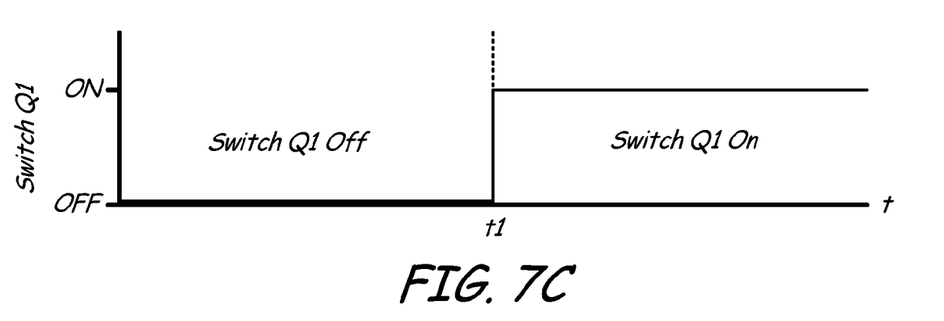

In particular, FIGS. 4A-4C illustrate a short-circuit fault in diode D1. FIGS. 5A-5C illustrate an open-circuit fault condition in diode D1. FIGS. 6A-6C illustrate a short-circuit fault in TVS device 14, and FIGS. 7A-7C illustrate an open-circuit fault in TVS device 14. In each set of figures, the top waveform represents the monitored voltage on control line 11 (i.e., V_signal), the middle waveform represents the monitored voltage at the cathode of TVS device 14 (i.e., V_AD), and the bottom waveform represents the state of switch Q1 as either On or Off.

In FIGS. 4A-4C, a short-circuit fault in blocking diode D1 results in the monitored voltage V_AD remaining equal to the monitored voltage V_signal. When switch Q1 is Off, the monitored voltage V_AD is lower than expected because (e.g., approximately 10 V instead of the expected 12 V). Likewise, when switch Q1 is On, the monitored voltage V_AD remains equal to the monitored voltage V_signal without the characteristic voltage drop across diode D1.

In FIGS. 5A-5C, an open-circuit fault in blocking diode D1 results in the monitored voltage V_signal remaining at 10 V even when switch Q1 is turned On. When Q1 is Off, the monitored voltage V_signal is at an expected 10 V, while the monitored voltage V_AD is at an expected 12 V. When Q1 is turned On, the monitored voltage V_signal remains at 10 V because blocking diode is faulted open. The monitored voltage V_AD meanwhile is pulled down to a voltage near zero.

In FIGS. 6A-6C, a short-circuit fault in TVS device 14 results in the monitored voltage V_AD being pulled down to approximately ground, and the monitored voltage V_signal being pulled down to a diode drop (across diode D1) above ground, whether switch Q1 is On or Off.

In FIGS. 7A-7C, an open-circuit fault in TVS device 14 results in the monitored voltage V_AD being held at a higher than expected voltage of approximately 15 V when switch Q1 is Off. In this way, the present invention is capable of both detecting the presence of various fault conditions in overvoltage protection circuit 12. In addition, the present invention may be capable of detecting the type of fault experienced by overvoltage protection circuit 12.

While the invention has been described with reference to an exemplary embodiment(s), it will be understood by those skilled in the art that various changes may be made and equivalents may be substituted for elements thereof without departing from the scope of the invention. For example, while the present invention has been described with respect to devices for protecting against positive transient voltages, similar devices may be employed to protect against negative transient voltages. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A built-in test circuit for an overvoltage protection circuit that provides transient overvoltage protection to electrical components connected to a control line, the overvoltage protection circuit includes a blocking diode connected in series with a transient voltage suppression (TVS) device via a first node and further includes a reference voltage for biasing the first node at a voltage sufficient to reverse bias the blocking diode during normal operations, the built-in test circuit comprising:
   a resistor connected to the first voltage node;
   a switch connected in series with the resistor and selectively turned On and Off to test the overvoltage protection circuit; and
   a controller that monitors a first voltage at the first node and a second voltage on the control line while the switch is On and while the switch is Off, and in response to the monitored first and second voltages detects the presence of faults in the overvoltage protection circuit.

2. The built-in test circuit of claim 1, wherein the controller compares the first and second monitored voltages to expected voltage values during a switch Off time and a switch On time to detect fault conditions.

3. The built-in test circuit of claim 2, wherein when the switch is Off, an expected voltage on the control line is less than an expected voltage at the first node.

4. The built-in test circuit of claim 3, wherein when the switch is On, the expected voltage on the control line is pulled down through the blocking diode, the resistor and the switch, and the expected voltage on the first node is pulled down through the resistor and the switch, wherein the expected voltage on the control line is greater than the expected voltage at the first node by the diode drop across the blocking diode.

5. The built-in test circuit of claim 1, wherein the controller detects a short-circuit fault in the blocking diode when the monitored first voltage is equal to the monitored second voltage regardless of whether the switch is On or Off.

6. The built-in test circuit of claim 1, wherein the controller detects an open-circuit fault in the blocking diode when the monitored second voltage remains unchanged whether the switch is On or Off.

7. The built-in test circuit of claim 1, wherein the controller detects a short-circuit fault in the TVS device when the monitored second voltage is approximately equal to ground plus a diode drop across the blocking diode, and the monitored first voltage is equal to ground whether the switch is On or Off.

8. The built-in test circuit of claim 1, wherein the controller detects an open-circuit fault in the TVS device when the monitored first voltage is approximately equal to the reference voltage when the switch is Off.

9. The built-in test circuit of claim 1, further including:
an analog-to-digital (A/D) converter connected to convert the monitored first voltage and the monitored second voltage to digital values to be supplied to the controller.

10. A method of detecting faults in an overvoltage protection circuit connected to provide transient overvoltage protection to electrical components having a control line output, the overvoltage protection circuit includes a blocking diode connected in series with a transient voltage suppression (TVS) device via a first node and further includes a reference voltage for biasing the first node at a voltage sufficient to reverse bias the blocking diode during normal operation, a test circuit includes a resistor connected in series with a switch and to the first node for pulling down the voltage at the first node when the switch On, the method comprising:
monitoring a first voltage at the first node and a second voltage on the control line while the switch is Off;
monitoring the first voltage and the second voltage while the switch is On; and
detecting fault conditions based on the monitored first voltage and the monitored second voltage when the switch is Off and when the switch is On.

11. The method of claim 10, wherein detecting fault conditions based on the monitored first voltage and the monitored second voltage includes:
comparing the first and second voltage values monitored while the switch is Off to expected voltage values associated with the switch being Off; and
comparing the first and second voltage values monitored while the switch is On to expected voltage values associated with the switch being On; and
detecting fault conditions based on the comparisons of the first and second voltage values with the expected voltage values when the switch is On and when the switch is Off.

12. The method of claim 10, further including identifying a type of fault associated with a detected fault condition.

13. The method of claim 12, wherein identifying a type of fault includes:
identifying a short-circuit fault in the blocking diode when the monitored first voltage is equal to the monitored second voltage regardless of whether the switch is On or Off.

14. The method of claim 12, wherein identifying a type of fault includes:
identifying an open-circuit fault in the blocking diode when the monitored second voltage remains unchanged whether the switch is On or Off.

15. The method of claim 12, wherein identifying a type of fault includes:
identifying a short-circuit fault in the TVS device when the monitored second voltage is approximately equal to ground plus a diode drop across the blocking diode, and the monitored first voltage is equal to ground whether the switch is On or Off.

16. The method of claim 12, wherein identifying a type of fault includes:
identifying an open-circuit fault in the TVS device when the monitored first voltage is approximately equal to the reference voltage when the switch is Off.

17. An electrical system comprising:
electrical components connected to an external control signal;
an overvoltage protection circuit connected in parallel with the electrical components to shunt excess power during an transient voltage event, the overvoltage protection circuit including a blocking diode connected in series with a TVS device via a first node, and further including a reference voltage for biasing the first node at a first voltage sufficient to reverse bias the blocking diode during normal operations; and
a built-in test circuit connected to monitor voltage at the first node and voltage on the control signal, the built-in test circuit further including a resistor and a switch connected in series between the first node and ground, wherein the switch is selectively turned On and Off and the voltage at the first node and at the control signal is monitored during an On time and an Off time of the switch to detect the presence of fault conditions in the overvoltage protection circuit.

18. The electrical system of claim 17, wherein the built-in test circuit further includes:
a controller that analyzes the voltage monitored at the first node and the voltage monitored on the control signal and identifies types of faults detected in the overvoltage protection circuit.

19. The electrical system of claim 18, wherein the controller differentiates and identifies faults including: short-circuit faults in the blocking diode, open-circuit faults in the blocking diode, short-circuit faults in the TVS device, and open-circuit faults in the TVS device.

* * * * *